United States Patent
Beltran

[15] 3,643,652
[45] Feb. 22, 1972

[54] MEDICAL BREATHING MEASURING SYSTEM

[72] Inventor: Delfin J. Beltran, 2364 Bryant Street, Palo Alto, Calif. 94301

[22] Filed: Dec. 31, 1969

[21] Appl. No.: 889,465

[52] U.S. Cl. .............................................. 128/2.08, 73/205
[51] Int. Cl. ....................................................... A61b 5/08
[58] Field of Search ................ 128/2.08, DIG. 17, 2.07, 351, 128/145.8, 2.05 F; 73/205, 206, 212

[56] References Cited

UNITED STATES PATENTS

| 3,081,766 | 3/1963 | Dubsky et al. | 128/2.08 |
| 3,216,250 | 11/1965 | Moreland | 73/205 |
| 2,332,567 | 10/1943 | Gardner | 73/205 X |
| 2,406,181 | 8/1946 | Wiegand | 73/205 X |
| 2,831,181 | 4/1958 | Warner | 340/213 |
| 3,499,435 | 3/1970 | Rockwell et al. | 128/2.05 |
| 3,414,896 | 12/1968 | Glick et al. | 128/145.8 X |
| 3,232,288 | 2/1966 | Krobath | 128/2.08 |

OTHER PUBLICATIONS

Honeywell, Co. Catalogue.
Surgery, Dec., 1968 pp. 1057–1070, Vol. 64, No. 6.

Primary Examiner—Richard A. Gaudet
Assistant Examiner—Kyle L. Howell
Attorney—Roger S. Borovoy

[57] ABSTRACT

A tube for measuring respiratory gas flow of a mammal, including a tube which fits into the mammal's trachea and a pair of ports spaced along its length. A pair of transmitting tubes are connected to the ports and the differential pressure measured across the free ends of the transmitting tubes in order to obtain an indication of the respiratory gas flow rate through the tube in the mammal's trachea.

6 Claims, 1 Drawing Figure

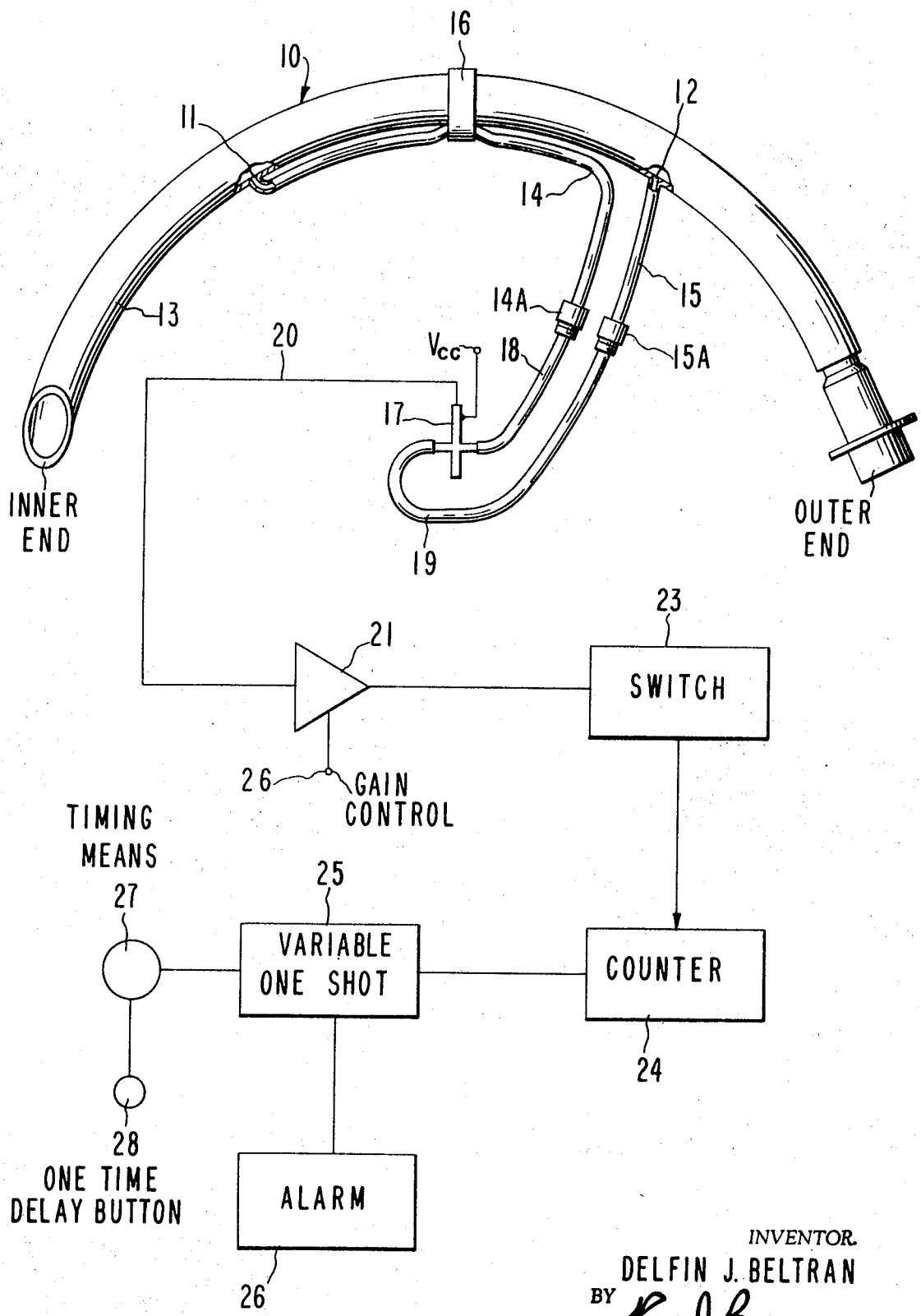

MEDICAL BREATHING MEASURING SYSTEM

FIELD OF THE INVENTION

This invention is used in the medical profession for evaluating a patient's ventilatory flow rate, particularly during and after the use of anesthetics or at any other time where such data is medically useful. At these times, it is essential to keep a constant monitor both on the patient's ventilatory flow rate and on the volume of air or oxygen actually taken into the patient's lungs. The device may also be used to assess pulmonary ventilation.

PRIOR ART

The prior art equipment usually measures the rate of breathing by measuring the influent and effluent gas breathed through a mask into a measuring chamber. The primary disadvantage of the equipment of the prior art is the requirement for a chamber to hold a volume of gas which is to be measured. The volume of the chamber must be filled up with gas in order to make the measurement. Yet this volume is of no respiratory value to the patient. This excess volume requires a larger capacity ventilator, and more importantly, introduces an error factor into the volume measurement. Additional pressure is required by the ventilator in order to pressurize the gas in such a chamber, along with the normal necessity of pressurizing the gas within the patient's lungs. This additional pressure within the patient's lungs may cause an obstruction of the blood circulation in the chest which can be dangerous to the patient. Finally, the requirement of a mask on the patient is bulky and unsatisfactory for longer term applications. For these reasons the prior art apparatus is generally deficient.

THE INVENTION

This invention provides a system for measuring the respiratory gas flow of a mammal, for example, a patient under anesthesia, using a unique sensing apparatus which is located inside of the patient's trachea. In this way, completely accurate measurement can be obtained both of the volume of air intake and outflow, and of the flow rate of air or oxygen into and out of the patient's lungs.

BRIEF DESCRIPTION OF THE INVENTION

Briefly, the subject invention relates to an endotracheal tube for measuring respiratory gas flow of a mammal, and a system employing such a tube, comprising: a tube, adapted to fit into the mammal's trachea, having a pair of ports spaced along its length, the ports each providing an indication of the air pressure in the tube at the position of the port; and a transmitting means connected to each of the ports for transmitting the pressure information externally of the trachea. Preferably, these transmitting means are a pair of tubes, one connected to one of the two ports and the other to the other port, for transmitting the pressure information to a differential pressure sensor external to the patient. The sensor measures the difference in pressure between the two ports. This differential pressure information provides an accurate measurement of the rate of air or oxygen flow into and out of the patient, and also of the volume of air or oxygen inhaled.

THE DRAWING

The single drawing is a schematic representation of one embodiment of an endotracheal tube of the invention, and a block diagram of the apparatus for detecting and using the pressure information transmitted.

DETAILED SPECIFICATION

The apparatus of the invention includes a tube 10 which may, for example, be a conventional endotracheal tube, which inserts into the trachea of a mammal. Such a tube (without the features of this invention) is well known in the art and is commonly employed during anesthesia and artificial ventilation to facilitate the ability of the patient to breathe.

In accordance with the invention, tube 10 has two ports 11 and 12 spaced along one wall 13. Connected and sealed to these ports are transmitting tubes 14 and 15, respectively, which, like tube 10, may be fabricated of a medically approved flexible plastic material such as Teflon or vinyl plastic. The tubes and the connections must be such that the circumferences of the ports 11 and 12 are maintained constant throughout the length of the transmitting tubes 14 and 15. The inner end of tube 10 is inserted into the trachea; the outer end normally protrudes outside of the patient's mouth. Transmitting tube 14, connected to port 11, is attached to tube 10 by means of tape 16, as illustrated, or other means, or may be incorporated directly into the wall of tube 10 to permit easy insertion into the patient's throat and to prevent any interference with normal breathing.

The free ends of transmitting tubes 14 and 15 are connected to a measuring means, such as a differential pressure sensor or transducer 17. Differential pressure transducers, such as differential strain gauges, are well known in the art and are used to measure the difference in pressure between transmitting tubes 14 and 15. In accordance to Poiseuilles law, the flow rate of gas through tube 10 is directly proportional to the drop in pressure between the two ports 11 and 12 along the length of tube 10 as measured across transducer 17. This assumes that the flow in tube 10 is substantially laminar, that the distance between ports 11 and 12, the radius of tube 10, and the viscosity of the gas are all constant. These assumptions are sufficiently true in cases relevant to the use of this invention. Minor deviations can be calibrated for. It is important that the ports 11 and 12 in the wall of tube 10 are of equal size and flush with the tube wall. This eliminates any dynamic pressure variations which might otherwise be induced by turbulence at the wall of the tube. Moreover, the length of tubes 14 and 15 must be substantially identical so that the proper phasing of the signals across the pressure transducer 17 is maintained. Volume adjusters 14A and 15A are plastic units whose volume is adjustable for easy calibration.

Pressure differential transducer 17 converts the pressure differential across tubes 14 and 15 into an electrical signal in a manner well known in the art. A voltage $V_{cc}$ is applied to the transducer to provide power. The output signal from pressure transducer 17 passes through line 20 to amplifier 21. Amplifier 21 has a conventional gain control means 22 used to adjust the gain. The amplifier has response characteristics capable of amplifying faithfully low-frequency signals of the breathing frequency, conventionally 0 to 16 cycles per second. At one point in each breathing cycle, usually at the peak rate of inhalation, the amplifier will provide an output voltage of a predetermined maximum level, indicating that the patient is at that predetermined point in a single breathing cycle. This voltage level is sufficient in each breathing cycle to close switch 23, thereby generating an electrical signal.

This electrical signal is used for two purposes. First, each time switch 23 is closed, counter 24 is actuated, adding one to the number of counted respiratory cycles. If desired, counter 24 can be of the conventional type which resets every 60 seconds. Accordingly, counter 24 will provide an indication of the number of breaths the patient has taken during the previous minute. If desired, counter 24 can be a printing counter which prints out the number of cycles counted prior to being reset to zero. Such counters are well known in the art and need not be described here. Alternatively, a counter can be used which measures the time interval between the most recent two breaths and calculates the breathing rate based upon such interval. The readout is then breaths per unit time (e.g., minutes).

The second use of the output signal from switch 23 is to indicate continued breathing. The absence of an output pulse for a predetermined period of time (for example, 15 seconds) shows the patient's breathing has at least temporarily ceased. To generate a signal in the event of such occurrence, switch 23 is also coupled to a timing means, such as time-variable one-shot 25. This one-shot is triggered by each pulse from switch 23. Once triggered, one-shot 25 will delay for a predetermined period of time, and then close a circuit. Provided, prior to the expiration of that predetermined period of time, the next trigger pulse is not received from switch 23, the circuit to alarm 26 will be closed and the alarm sounded. For example, if the one-shot is set for 15 seconds (indicating that the patient has not completed a breathing cycle for 15 seconds) the one-shot 25 will energize alarm 26 (which could be a light, buzzer, or any other type of indication) showing the doctor that the patient's breathing has deteriorated. The timing of one-shot 25 can be varied from 0 to 30 seconds, at the option of the doctor.

If desired, as an additional feature, the one-shot may have conventional circuitry controlled by a pushbutton 28 which extends the timing delay to about 30 seconds for one time only. This single delay is used by the nurse when it becomes necessary to disconnect the ventilation for the normal suctioning process periodically required.

Once tube 10 is properly calibrated, and the proportionality constant between the flow rate as measured by transducer 17 and the volume of air passing through the tube is known, the total volume of air flowing through the tube may be calculated. This total volume (in volume units per minute) equals the known volume per breath times the breathing rate as measured by counter 24. If desired, the measure of total volume of air intake per minute may be used as part of a closed loop ventilator servosystem to control the operation of the ventilator automatically.

Summarizing the use of the apparatus of this invention, tube 10 is inserted into the trachea of the patient requiring breathing assistance or airway support, or who is under anesthesia. The outer end of the tube is connected to a suitable ventilatory assister which is set to the desired flow, pressure, volume, and rate required for the patient. The tube 10 is normally sealed within the patient's trachea with an inflatable cuff or other device, as are well known in the art. In the case of children, the cuff may be eliminated by careful selection of the diameter and length of tube 10. This pressure assures that the patient will have a predetermined amount of air or oxygen. The gain of amplifier 21 is first reduced using gain control 26 until the gain is insufficient to activate switch 23 while the patient is breathing. Then the gain is increased slowly until triggering of switch 23 occurs once during each respiratory cycle of the patient. Timing means 27 of one-shot 25 is then set for the minimum tolerable breathing cycle spacing (e.g., 15 seconds). A spacing greater than 15 seconds will then result in a signal from alarm 26.

The system of the invention is so sensitive that it can detect temporary differences in flow through tube 10 caused by the beating of a human heart.

I claim:

1. An endotracheal tube for measuring respiratory gas flow of a human, comprising:
   a flexible plastic tube adapted to fit into a human body, said tube having an inner end adapted to fit within a human trachea and an outer end adapted to extend outside said trachea, said flexible plastic tube having a pair of ports spaced along the portion thereof adapted to be located within said human body, said ports each providing an indication of the air pressure in said tube at the position of such port;
   a pair of flexible tubes, one connected to one of said pair of ports and the other connected to the other of said pair of ports, both of said pair of tubes extending along said portion of said flexible plastic tube towards said outer end of said flexible plastic tube for transmitting said pressure indication externally of said trachea said flexible plastic tube and said pair of flexible tubes each having a substantially constant, unobstructed internal diameter throughout their lengths; and
   a measuring means for measuring the differential pressure across said pair of tubes.

2. The apparatus of claim 1 wherein said ports are of substantially equal size.

3. The apparatus of claim 1 wherein both of said pair of tubes are of equal length.

4. The apparatus of claim 1 further characterized by the addition of a counter coupled to said measuring means, said counter being capable of counting the breathing rate through said tube from said differential pressure.

5. The apparatus of claim 4 further characterized by the addition of a timing means coupled to said counter, said timing means being reset by a predetermined cyclical pressure indication from said measuring means, and failing to be reset in the absence of such indication.

6. The apparatus of claim 5 further characterized by the addition of an alarm coupled to said timing means and being triggered by the failure of said timing means to be reset within a predetermined period of time.

* * * * *